United States Patent Office 3,537,808
Patented Nov. 3, 1970

3,537,808
METHOD OF DEPOSITING POLYMERS ON FIBROUS PRODUCTS
John L. Gardon, Levittown, Pa., assignor to Rohm & Haas Company, Philadelphia, Pa., a corporation of Delaware
No Drawing. Filed Feb. 17, 1961, Ser. No. 89,921
Int. Cl. D06m 13/34
U.S. Cl. 8—116.2                            46 Claims The present invention is concerned with a process for producing improved fibrous products modified by either an impregnation or a coating of a condensation polymer.

Deposition of polymeric materials is commonly used for improving properties of fibrous products. Heretofore, to deposit a surface polymer, the polymer was preformed and applied to the substrate in solution or dispersion. Application from solution entails a number of disadvantages. For such application the polymer has to be soluble in the solvent used, and perforce the finished product is sensitive to such solvent. Thus, most polymeric finishes applied from water or organic solvents are not fast to washing or dry-cleaning. The alternate process of applying polymers from aqueous dispersions has the disadvantage that, in general, a heat treatment is required to develop the properties of the finish. Both solution and dispersion applications have the important disadvantage that the polymer, being preformed prior to application, cannot penetrate into the substrate with the result that the contact between the polymer and the substrate is poor, the adhesion of the polymer to the substrate is low and the modifying effect is confined to the surface of the substrate. These statements are generally applicable to both condensation and addition polymers.

It is an object of the present invention to provide a process for the production of fibrous products modified by impregnation or coating so as to provide improved penetration and better adhesion of the condensation polymers to the fibrous substrate. Another object is to provide a process for the production of impregnated and/or coated fibrous products wherein the fibrous product is modified by a condensation polymer impregnant or coating, and in which improved control of the distribution can be effected. By this is meant that either a more uniform distribution is obtained when desired, or the condensation polymer is deposited in a limited zone in a more selective fashion whenever desired. Another object is to provide a method of depositing on fibrous substrates polymers which are not readily soluble in conventional solvents, thus giving effects which are exceptionally fast to washing and dry cleaning. A further object of this invention is to provide a method to deposit surface polymers on fabrics which modify the fabric properties without requiring heating of the treated fabric. Other objects and advantages of the invention will be apparent from the description thereof hereinafter.

In accordance with the present invention, an improved process for impregnating and/or coating fibrous substrates is provided in which the final modified product carries a deposit either in the form of an impregnant or a coating of a condensation polymer. However, by the process of the present invention, this condensation polymer is formed in situ within the pores, or adjacent to the surface, or on the surface of the substrate, depending upon the particular nature of the fibrous substrate and upon the extent of impregnation by the applied medium.

By the present invention, two mutually reactive reactants or precursors of the condensation polymer are applied in distinct liquid phases, either simultaneously or in succession. One of the reactants which may be referred to, and is hereinafter referred to, as a class A reactant is an acid halide type. The other, which may be referred to as a class B reactant, is a compound containing at least two active hydrogen atoms which are more reactive than alcoholic hydrogen. Thus, these active hydrogen atoms may be provided by the group consisting of —SH, phenolic hydroxyl, and amino or amidino groups of the formula —NHR (where R is hydrogen or alkyl). The reactants of class A contain two acyl halide groups and, preferably for most purposes, the compounds contain two, and only two, such groups. Furthermore, the reactants of class B contain at least two of the groups containing hydrogen atoms which are more active than alcoholic hydrogen, and for most purposes, the compounds contain two, and only two, such groups.

The two different reactants are applied to the fibrous substrate in substantially immiscible liquid phases. Depending on the effect desired, there may or may not be a drying of one phase (that of a preliminarily applied reactant) before the second reactant is applied in its liquid system. Reactants may be applied undiluted, that is "in bulk," or as dilute solutions in suitable solvents, or in emulsions. Regardless of which manner of application is used, the liquid medium by which one of the reactants is dissolved, should be substantially immiscible with the solvent used for the other reactant. The condensation polymer resulting from the reaction between the two reactants is preferably insoluble in both phases. However, if the process involves application of the phases in succession, it is permissible that the condensation polymer be insoluble in the last phase to be applied regardless of its solubility in the first liquid phase. When the polymer is not insoluble in the first liquid phase applied, it is generally desirable and preferred to dry the first liquid phase before applying the second.

The two separate phases may involve solutions of the respective reactant in different immiscible organic solvents, or in a preferred embodiment one of the reactants may be applied by means of an aqueous solution, and the other may be applied as a solution in an organic solvent which is essentially immiscible with water, or in an emulsion of such solvent in water. The system of the present invention, however, does not preclude the presence of a small proportion in one of the liquid phases of a solvent which is miscible with the other phase, as long as the two liquid phases by which the two different reactants are applied are essentially on the whole immiscible with each other.

In general, the reactants and the solvents employed are such that under the conditions of reaction to form the polymer, they do not deleteriously react with or dissolve the fibrous substrate. The reactants or solvents used may be such as to exert a swelling effect on the fibrous substrates or portions thereof, and for some purposes, this swelling effect may be desired to facilitate better penetration of the substrate by the reactant in the medium as well as by the condensation polymers resulting from the reaction. However, it is not essential that the reactants or solvents exert a swelling effect on the substrate.

A simplified flow diagram illustrating several embodiments of the invention is as follows:

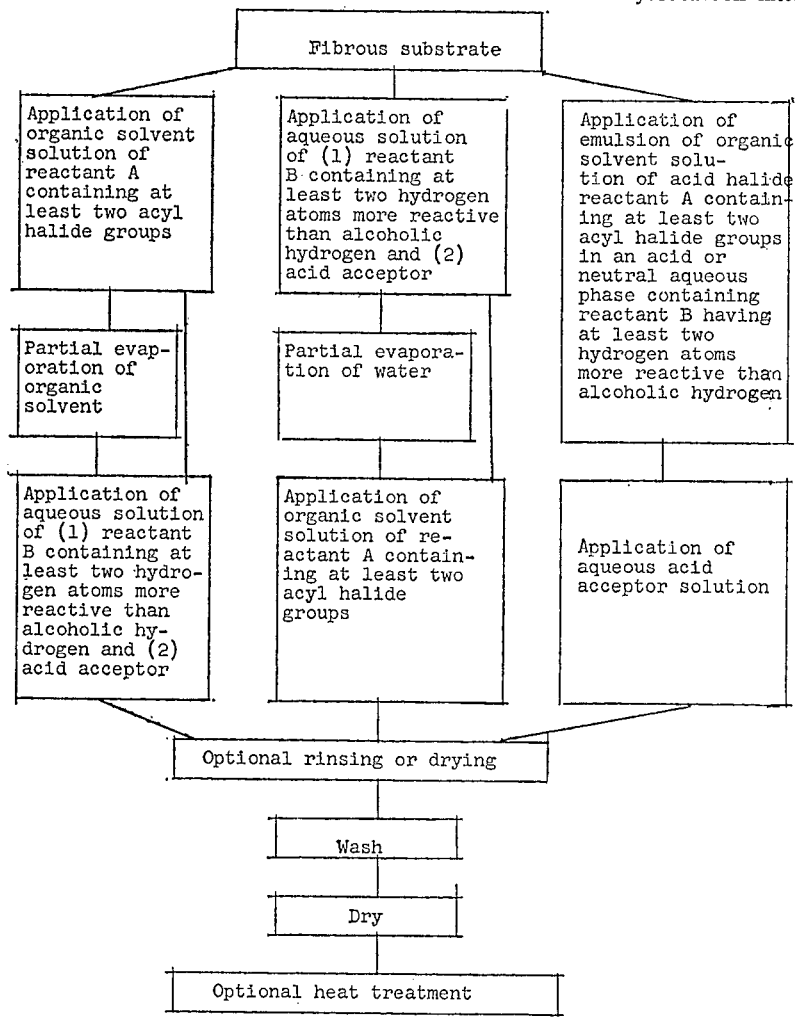

The reactants of class A may, as stated hereinabove, be termed acid halides. The types of halides thus embraced include polycarboxylic acid halides, polysulfonyl acid halides, bis-haloformates and bis-carbamyl halides. The invention is primarily concerned with the difunctional compounds, and the dicarboxylic halides may be generally represented by the type Formula I as follows:

$$XCO-R-COX \quad (I)$$

where X is chlorine, bromine, or fluorine, and

R is an aliphatic or aromatic hydrocarbon or such a hydrocarbon interrupted by ether oxygen atoms.

The disulfonyl halides may be represented by the type Formula II as follows:

where X is chlorine, bromine, or fluorine, and

R is an aliphatic or aromatic hydrocarbon or such a hydrocarbon interrupted by ether oxygen atoms.

The bis-haloformates may be represented by the type Formula III as follows:

$$X-CO-ORO-CO-X \quad (III)$$

where X is chlorine, bromine, or fluorine, and

R is an aliphatic or aromatic hydrocarbon or such a hydrocarbon interrupted by ether oxygen atoms.

The bis-carbamyl halides may be represented by the type Formula IV as follows:

$$X-CONHRNHCO-X \quad (IV)$$

where X is chlorine, bromine, or fluorine, and

R is an aliphatic or aromatic hydrocarbon or such a hydrocarbon interrupted by ether oxygen atoms.

Examples of the carboxylic acid halides include phosgene, adipoyl chloride, sebacoyl chloride, terephthaloyl chloride, and the acid halides derived from oxalic, succinic, suberic, azelaic, isophthalic, and hexahydroterephthalic acids. The chlorides and bromides are, of course, the most important of these acid halides.

The organic disulfonyl halide is selected from the acid fluorides, chlorides, and bromides of aliphatic, aromatic, cycloaliphatic, and disulfonic acids. Illustrative of disulfonyl halides are decane-1,10-disulfonyl chloride; hexane-1,6-disulfonyl chloride; 3,6-dioxaoctane - 1,8 - disulfonyl chloride; paracyclohexanedisulfonyl chloride; nuclear sub-substituted benzenedisulfonyl chlorides; naphthalenedisulfonyl chlorides, and the like; 1,5-naphthalene disulfonyl chloride, 1,2-ethanedisulfonyl chloride, and 1,6-hexanedisulfonyl chloride, metabenzene-disulfonyl chloride, methylene-bis-para-benzene-sulfonyl chloride, p,p'-diphenylsulfone-disulfonyl chloride, hexamethylenedisulfonyl chloride, 1,3-benzene, 1,4-benzene, 1,5-naphthalene, 1,2-ethane, 1,6-hexane and 1,4-cyclohexane disulfonylchlorides.

Of the bis-haloformates, the bis-chloroformates are the most useful including the bis-chloroformates of diols such as ethylene glycol, trimethylene glycol and 1,4-butanediol, and higher glycols wherein the alkylene chain contains a greater number of carbon atoms and may be a straight chain or a branched chain. Examples of other diols whose bis-chloroformates may be employed are ω,ω'-dihydroxy-dialkyl ethers, ω,ω'-dihydroxy-dialkyl thioethers, bis-glycol or diglycol esters of straight chain or branched chain aliphatic dicarboxylic acids such as the bis-ethylene glycol ester of succinic acid, the bis-diethylene glycol ester of succinic acid, the bis-ethylene glycol ester of blutaric acid, the bis-ethylene glycol ester of adipic acid, the bis-ethylene glycol ester of pimelic acid, the bis-ethylene glycol ester of suberic acid, azelaic acid or sebacic acid, the diol, dimer or trimer esters obtained by the conversion of an excess of an aliphatic glycol with a dicarboxylic acid of the several aliphatic dicarboxylic acids mentioned above, $\omega,\omega'$-dihydroxy-dialkyl ethers of hydroquinone, $\omega,\omega'$-dihydroxy dialkyl ethers of dihydroxy cyclohexane, $\omega,\omega'$-sulfonyl bis-alkanols, i.e. bis - ($\omega$ - hydroxyalkyl-sulfones), N,N'-($\omega$-hydroxyalkyl)-dicarboxyamides such as N,N'-($\beta,\beta'$-dihydroxy-diethyl)-adipamide, cycloaliphatic glycols as cyclohexylene glycol, dihydroxy tetrahydrofurane, hydroxy-hydroxymethyl furane, hydroxy-hydroxymethyl-tetrahydrofurane, and dihydroxy-oxathiane dioxide. Also useful are the bis-chloroformates of 1,2-butanediol, 1,6-hexanediol, 1,4-cyclohexanediol, hydroquinone, and 2,2'-bis(4-hydroxyphenyl)-propane(bisphenol A).

Examples of the bis-carbamyl halides include particularly the piperazine-1,4-dicarbonyl chloride and the bis-carbamyl chlorides of other diamines including especially ethylene diamine and hexamethylenediamine.

A preferred group may thus be that in which the reactant A is selected from the group consisting of phosgene, 2 to 14 carbon chain aliphatic dicarboxylic acid chlorides, 2 to 14 carbon chain aliphatic dicarboxylic acid chlorides with the backbone chain interrupted by ester, amide or ether links, iso- or tere-phthaloyl chloride, bischloroformates of 2 to 14 carbon chain aliphatic glycols, bischloroformates of 2 to 14 carbon chain aliphatic glycols with the backbone chain interrupted by ester, amide or ether links, and the bischloroformates of diphenols selected from the group of bisphenol A, hydroquinone and resorcinol.

The reactant of class B may be a polyamine, and particularly a diamine, a diphenol in the form of an alkali metal salt, a dithiol, an aminoalkylphenol, an aminothiol, guanidine, thiourea and dithiobiuret.

The diamines may be represented by the type Formula V as follows:

$$H_2N-R-NH_2 \qquad (V)$$

where R is an aliphatic or aromatic hydrocarbon or such a hydrocarbon interrupted by ether oxygen atoms.

The classes of diamines which may be used in the process of this invention include the basic materials represented by the aliphatic primary and secondary diamines, aromatic primary diamines, aralkyl primary diamines, and cycloaliphatic diamines. Representative diamines of the above classes of reactants which can be used in accordance with this invention include ethylenediamine, propylenediamine, butylenediamine, pentamethylenediamine, hexamethylenediamine, p-phenylenediamine, 4-methyl-m-phenylenediamine, bis(p-aminomethyl)-menthane, 1,4-diaminocyclohexane, piperazine, and trans-2,5-dimethyl-piperazine, tetramethylenediamine, pentamethylenediamine, hexanemethylenediamine, 2,5-dimethylhexamethylenediamine, decamethylenediamine, piperazine, bis-(N-aminoethyl)piperazine, N,N'-dimethylhexamethylenediamine, N-methylhexamethylenediamine, o-, m- and p-phenylenediamine, 3,6-diaminodurene, benzidine, naphthalene diamines, p-aminobenzylamine, 1,4-diaminocyclohexane and hexahydroparaxylylenediamine. Amino groups of very low basicity, such as N-aryl substituted aromatic amino groups do not respond in the process of this invention.

Examples of diphenols include resorcinol, hydroquinone, 4,4'-dihydroxy diphenyl-methane 2,2'-bis(4-hydroxy-3-chlorophenyl)-propane and also 4,4'-bis(4-hydroxyphenyl propane).

The dithiols which may be used in the process of this invention include the primary, secondary and tertiary dithiols of aliphatic, araliphatic, cycloaliphatic and aromatic hydrocarbons. Illustrative of some of the more desirable dithiols are 1,2-ethanedithiol, 1,4-butanedithiol, decamethylenedithiol, 1,3-benzenedithiol, 1,5-naphthalenedithiol, p-xylylenedithiol, 1,4-benzenedithiol, 2,6-naphthalenedithiol, 1,4-cyclohexanedithiol, etc. The most desirable results are obtained with hydrocarbon dithiols of 2 to 10 carbon atoms.

Examples of aminoalkylphenols and of aminothiols include 4-hydroxy- and 4-mercapto-aniline and mercaptoethylamine.

A preferred group is that in which reactant B is selected from the group consisting of 2 to 14 carbon chain aliphatic primary diamines, 2 to 14 carbon chain aliphatic primary diamines with the backbone chain interrupted by ether, ester, amide or amine, piperazine, piperazine derivatives with methyl, methoxy, ethyl and ethoxy substitution in the 2 and/or 5 positions, bisphenol A, resorcinol, hydroquinone and the acid halide acceptor is selected from the group of alkali metal hydroxides, alkali metal carbonates, and ammonium hydroxide.

After application of the two reactants in immiscible phases, reaction is effected at a temperature from minus 10 to plus 90° C. but preferably at room temperature. The pH of the system may be adjusted to favor the reaction. It is generally desirable to maintain a system on the alkaline side, and in the case of the bis-haloformates it is necessary that the pH be in the range of 8 to 12. The alkaline condition may be accomplished simply by the use of an excess of the reagent when it contains amine groups. Alkali metal hydroxides or carbonates are used in the case of the phenols so that in effect they are in the form of alkali metal phenoxides during the reaction. One of the byproducts of the reaction is a hydrohalide and an alkaline material is desirable to accept the hydrohalide released by the reaction and convert it to the halide salt form.

The reactant of class A is soluble in non-polar organic solvents including benzene, toluene, xylene, cyclohexane, trichloroethylene, chlorobenzene, nitrobenzene, heptane, iso-octane, diethyl ether, ethyl acetate, methyl amyl ketone, ethylene dichloride, carbon tetrachloride, chloroform, etc. It is essential that the solvents be materials which do not react as readily with either polymer-forming intermediate as does its complementary intermediate, and thus reduce the probability of polymer formation. When the reactant of class B is added in water, the non-polar solvents are used, particularly the hydrocarbons and chlorinated hydrocarbons. The reactant of class B is generally soluble in water, and hence, it is quite advantageous to employ aqueous solutions thereof. When solutions of the reactants are applied, the concentration may range from about 0.01 to 3 molar (i.e. moles per liter) and preferably from 0.1 to 0.5 molar for reactant A. The reactant of class B is preferably used at a greater concentration than that of the reactant A in the organic phase. When the reactant A is applied first in an organic solvent and partial drying is effected before application of reactant B, the concentration of reactant B should exceed the concentration obtained by the partial drying of the first containing reactant A. While drying between the steps of applying the two reactants is not essential in some cases it is preferred to dry therebetween to reduce the content of solvent to 5% to 300% by weight on the dry weight of the substrate.

When the two reactants are applied in succession, either one may be applied to the fibrous substrate before the other, and it is optional, but generally preferable, to partially dry the reactant medium first applied before applying the second one. For many purposes, it is preferred to apply reactant A in an organic solvent first, and follow this with the application of reactant B in water. An exception is in the case of the pigment printing or dyeing of paper, textiles, or the like, or the coating of leather or other substrates with a pigment, in which event it is generally preferable to apply reactant B in aqueous phase with the pigment dispersed therein before applying reactant A in a polar organic solvent. By drying the first applied reactant, the tendency to lay down a flaky surface deposit is generally completely prevented. The drying is particularly valuable in the pigment-dyeing or printing of fibrous materials, and it often greatly improves the appearance and feel of the surface of the final product.

After applying the second reactant, the reaction occurs very quickly, frequently within a period of less than 1 to 10 seconds. After drying the fabric, it is often desirable to heat the coated or impregnated product to a temperature of 150 to 250° or to raise the condensation polymer above its melting or glass transition point if it is fusible and thereby favor the uniform distribution and thorough penetration of interstices of the fibrous product.

This invention is not limited to the combination of a single reactant A with a single reactant B on fibrous substrates. If a particularly soft or hard polymeric deposit is required, it is desirable to use two or more chemically different compounds of each reactant type simultaneously, thus obtaining a copolymer deposit. For example, a reactant A mixture consisting of a diacid chloride and a glycol bischloroformate combined with a diamine gives a polyamide-polyurethane copolymer deposit which is very soft and rubbery. Alternately, but for the same purpose, a polyamide copolymer can be obtained by combining two or more chemically different diacid chlorides with one, two or more chemically different amines. To obtain hard deposits, trifunctional or tetrafunctional equivalents of reactant A or B can be coreacted in the system to obtain a cross-linked copolymer. Examples of such coreactants are tricarballyl chloride, the tri- or tetrachlorides of trimesic or mellophanic acid, tri- or tetrachloroformates of glycerol, tri- and tetrahydroxybenzenes and tri- or tetrahydroxy toluenes.

Besides applying the reactants uniformly over the entire surface or through the entire mass of any fibrous product being modified, the invention is adaptable to local application such as in the pigment-dyeing or binding of non-woven fabrics. In such local application, the second reagent, or both, may be applied to limited areas wherever desired, as in a printing operation.

Instead of applying the two liquid phases containing the respective reactants separately and in succession, they may be applied simultaneously by forming an emulsion of one phase within the other. For example, the reactant A may be dissolved in a non-polar organic solvent, and the resulting solution may be emulsified in water in which reactant B is dissolved. The resulting emulsion may be applied in any suitable manner to the fibrous substrate, and a hydrogen halide acceptor may be applied after the emulsion is deposited on the substrate. If desired, the acceptor may be introduced into the emulsion just before deposition of the emulsion on the substrate.

In all of the procedures using reactants A and B mentioned hereinabove, room temperature is generally adequate to effect the reaction desired, but the temperature may be raised to as high as 100° C. at the time of, or after, application of the reactants to the fibrous substrate. Again it may be desirable, in certain cases, to cool the substrate, or preheat the substrate, such as to 0° or even below zero (e.g. minus 10° C.) in the case of cooling, or up to 100° C. in the case of heating.

The separate phases or the emulsion system may be applied to the fabric by any suitable equipment such as by means of a padder, a jig, slashing equipment, sprays, brushes or the like. After application of either or both phases, there may optionally be used a rinsing step, a squeegeeing step, or a mechanical wiping step to control the amount of deposit.

The fibrous substrate which may be coated or impregnated by the process of the present invention may be a paper, a textile material, leather, or wood. The papers may be of highly absorbent and porous type used for saturating purposes. The papers may thus be bonded, and carded webs of textile length fibers, or air-deposited webs of fibers either of paper-making or of textile length may similarly be bonded by the impregnant of the present invention to provide unified backing layers for pressure-sensitive tapes, particularly such as are commonly known as masking tapes. The procedure of the present invention may be employed to improve both dry and wet tensile strengths and the tear-strength of paper and related paper like textile materials of non-woven character.

The process of the present invention may also be employed for providing lubricating and sizing finishes on textile materials of all types, and particularly on bulk fibers to be carded or yarns to be woven or knitted, and threads or cords or other plied textile structures to be used for sewing, brading or the formation of knotted textiles. The process of the present invention may be employed for imparting water-repellency or waterproof characteristics to the fibrous substrates whether of paper, leather, textile, or wood types. The process of the present invention may be applied for eliminating the "pilling" of the fibers in textiles made of synthetic materials such as nylon, polymers of acrylonitrile, and the like.

The process of the present invention may be employed not only for the purpose of lubricating textile materials to render them more amenable to textile processing, but also for the purpose of improving the abrasion-resistance of textiles and leather. The process is adapted to provide permanent finishes on all of the fibrous substrates mentioned. They are also particularly well adapted for the binding of pigments and providing colored impregnants and coatings for these fibrous substrates, such as in the pigment-printing and dyeing of textiles. The process of the invention may be employed for the provision of back coatings for pile fabrics and also for the coating of the tips of the tufts in pile fabrics to provide modified characteristics thereto, particularly to reduce the tendency of such fabrics to collect dirt.

The proportion of condensation polymer left within or on the substrate may amount to as little as $\frac{1}{10}$% by weight on the fibers at the surface of the product, or even as little as $\frac{1}{10}$% by weight of the entire weight of fibers in the product. Thus, in the treatment of a textile fabric for lubricating or rendering the fabric resistant to the development in electrostatic charges, as little as about $\frac{1}{10}$% by weight of the condensate may be adequate. In the prevention of pilling of fabrics formed of synthetic resin fibers, in the stabilization of wool or in the imparting of an abrasion-resistant quality to fabrics of all types, the amount of polymer deposited may be in the range of 1 to 20% on the weight of the substrate. A similar range applies when it is desired to impart wet strength to papers or thin non-woven fabrics. In the preparation of non-woven fabrics using the condensation polymer as a binder for the fibers therein, the amount of the polymer may range from about 20% up to 200% on the weight of the fibers.

For most of the applications with which the invention is particularly concerned, the formation of a linear type of condensation polymer is preferred and entirely satisfactory. For this purpose, reactant A contains two acidic halide groups and reactant B contains two of the groups containing active hydrogen of more reactive character than alcoholic hydrogen. Since both reactants are of bifunctional character in respect to the reaction involved, a linear type of condensation product is obtained. For some purposes where a three-dimensional or highly cross-linked polymeric product is desired, a small proportion of a tri- or tetra-functional reactant is used. For example, tri-carballylic acid chloride may be used as liquid A and tri-methylenetetramine may be used as reactant B. It is to be understood, of course, that these are only suggested reactants, and that they can be replaced with any reactants of the other groups mentioned which contain three or more of the functional groups mentioned.

EXAMPLES

The examples outlined below are illustrative of the invention. For sake of simplicity, only one method of application is described but it is understood that the invention is not confined to this method of application. This method can be divided into two distinct steps:

First step.—The fibrous assembly is impregnated with a solution of one reactant and the excess solution is removed on a padder if the substrate is a textile material, or by blotting with absorbant filter paper if the substrate is leather or paper.

Second step.—The thus impregnated assembly is immersed for 2 minutes into an excess of a solution containing the other reactant. All these operations are carried out at room temperature. Unless otherwise indicated, the two steps follow immediately after one another; partial drying between the two steps is optional and has remarkable effects on the fabric properties. After the second step impregnation, the fabrics are washed using strong mechanical agitation in a washing machine, unless otherwise indicated. An optional step between the second step and washing of the samples is a mild rinse without mechanical agitation, followed by drying at room temperature with or without subsequent heat treatment for 15 minutes at 170° C.

Occasionally the fabrics are weighed prior to and after the treatment, the weight gain is expressed as percent of the original fabric weight. The reactant solutions are made up on weight per volume basis and their concentration is expressed as gram-weight/100 millimeter volume or as gram-mole/liter. Occasionally, the fabric assembly is weighed immediately after the first step impregnation to determine the solution pick-up, expressed as weight percent of the original weight. From this figure, and from the concentration and density of the first step solution, the amount of the reactant applied in the first step is determined. The efficiency of resin deposition can then be determined from this value and the weight gain, as illustrated in Example 1.

EXAMPLE 1

To deposit nylon 610, 11.95% (0.5 M) sebacoyl chloride in $CCl_4$ is applied to cotton printcloth in the first step to obtain 162% solution pick-up. This first step solution has a density of 1.55 g./ml. Subsequently the assembly is immersed into an excess of aqueous 17.4% (1.5 M) hexamethylene diamine solution which also contains about 1% NaOH. After washing and drying, the weight gain is 13.4%. The weight of the treated fabric does not change when washed a number of times or when extracted with solvents commonly used in dry cleaning.

The theoretical retention of sebacoyl chloride is calculated as follows. The molecular weight of sebacoyl chloride is 239 and that of the diamine is 116. When the two reagents combine, two moles of HCl are liberated and the unit weight of the repeating unit of the resulting polymer is 239+116−73=282. It follows that 1 part in sebacoyl chloride applied to the fabric in the first step would theoretically yield 282/239=1.18 parts of polymer. In this run therefore, $(162 \times 11.95)/(1.55 \times 100) = 12.5\%$ sebacoyl chloride is applied to the fabric. The theoretical retention of the polyamide is $$(13.4 \times 100)/(1.18 \times 12.5) = 90\%$$

In the examples described below the retention is calculated in identical manner.

EXAMPLE 2

To deposit either hexamethylene diamine-based polyamides, polyurethanes, polysulfonamides, polyureas, or bisphenol A-based polyesters, polycarbonates and polyurethanes on cotton, the procedure of Example 1 is followed. Bisphenol A herein represents p,p′-isopropylidene bisphenol. In the first step 0.5 molar $CCl_4$ solution of reagent A is padded on the fabric. The second step involves the use of either aqueous 1.5 M hexamethylene diamine containing 1% NaOH or aqueous 0.75 M bisphenol A containing 6% (1.5 M) NaOH. The results are shown in Table I. In this and in the following tables ΔW (percent) indicates the weight gain of the fabric and T.R. (percent) is the theoretical retention of the polymer.

TABLE I

| | Reagent B | | | | | |
| | Hexamethylene diamine | | | Bisphenol A | | |
| Reagent A | Run No. | ΔW, percent | T.R., percent | Run No. | ΔW, percent | T.R., percent |
|---|---|---|---|---|---|---|
| Diacid Chlorides: | | | | | | |
| Oxalloyl | 1 | 2.1 | 24 | 11 | 3.1 | 42 |
| Adipoyl | 2 | 9.2 | 72 | 12 | 20.6 | 100 |
| Sebacoyl | 3 | 13.4 | 90 | 13 | 21.5 | 100 |
| Isophthaloyl | 4 | 4.9 | 24 | 14 | 22.0 | 76 |
| Terephthaloyl | 5 | 6.2 | 28 | 15 | 8.1 | 25 |
| 1,4-benzenedisulfonyl | 6 | 10.0 | 92 | | | |
| Bischloroformates of— | | | | | | |
| Ethyleneglycol | 7 | 10.5 | 84 | 16 | 29.7 | 100 |
| Diethyleneglycol | 8 | 13.3 | 100 | 17 | 21.0 | 100 |
| Bisphenol A | 9 | 21.0 | 88 | 18 | 26.3 | 100 |
| Hexamethylene diamine | 10 | 6.9 | 98 | 19 | 16.3 | 80 |

The treatments involving the use of sebacoyl chloride, isophthaloyl chloride, diethylene glycol bischloroformate and bisphenol A bischloroformate in the first step and bisphenol A in the second step (Run No. 13, 14, 17, 18) render the fabric water-repellent. This is demonstrated by placing a water drop on the fabric. On untreated fabric the drop disappears instantaneously, while on the appropriately treated fabric it persists 2 to 3 hours. It is noteworthy that this effect can only be achieved if the second step treatment follows immediately after the first step and if reagent A is applied first. Drying between steps or reverse order of application does not given this effect.

EXAMPLE 3

To deposit ethyleneglycol bischloroformate-based polymers, 0.5 M ethyleneglycol bischloroformate in $CCl_4$ is padded on cotton. These fabrics are after-treated either with 1.5 M aqueous solutions containing 1% of NaOH or 0.75 M phenol solutions containing 6% NaOH. The results are shown in Table II.

TABLE II

| Reagent B | Run No. | T.R., percent | ΔW, percent |
|---|---|---|---|
| Hexamethylene diamine | 7 | 84 | 10.5 |
| Ethylene diamine | 20 | 44 | 4.2 |
| Diethylene triamine | 21 | 14 | 1.7 |
| 3,3′-iminodipropylamine | 22 | 17 | 2.3 |
| Piperazine | 23 | 33 | 3.0 |
| Resorcinol | 24 | 81 | 10.0 |
| Hydroquinone | 25 | 98 | 10.6 |
| Catechol | 26 |  | 0.3 |
| Pyrogallol | 27 | 18 | 2.4 |
| Phloroglucinol | 28 | 10 | 1.3 |
| Mercaptoethylamine | 29 | 56 | 5.3 |

EXAMPLE 4

Cotton printcloth is padded with 9.35% (0.5 M) ethyleneglycol bischloroformate in different solvents or emulsions. The after-treatments are identical to those of Example 2. The results are shown in Table III.

TABLE III

| | Reagent B | | | | | |
|---|---|---|---|---|---|---|
| | Hexamethylene diamine | | | Bisphenol A | | |
| | Run No. | ΔW, percent | T. R., percent | Run No. | ΔW, percent | T. R., percent |
| Solvent used in first step: | | | | | | |
| Toluene | 30 | 6.2 | 41 | 38 | 22.1 | 100 |
| CHCl₃ | 31 | 3.8 | 30 | 39 | 21.0 | 100 |
| CCl₄ | 32 | 11.0 | 84 | 40 | 21.4 | 100 |
| 28% toluene/70% H₂O/2% mixed anionic and non-ionic emulsifiers | 33 | 7.4 | 60 | 41 | 6.3 | 35 |
| 28% CHCl₃/70% H₂O/2% sodium lauryl sulfate | 34 | 2.5 | 23 | 42 | 1.5 | 10 |
| 28% CCl₄/70% H₂O/2% nonionic emulsifier | 35 | 3.6 | 39 | 43 | 7.1 | 53 |
| 60% toluene/40% acetone | 36 | 10.7 | 100 | | | |
| 19% toluene/19% acetone/60% H₂O/2% non-ionic emulsifier | 37 | 7.6 | 65 | | | |

EXAMPLE 5

An emulsion is prepared consisting of 4.7 parts of ethyleneglycol bischloroformate, 9.5 parts of hexamethylenediamine dihydrochloride, 4 parts of Triton X–100, 20 parts of toluene, 10 parts of acetone and 51.8 parts of water. This emulsion is padded on cotton printcloth and subsequently the fabric is immersed into 4% NaOH solution (Run No. 44). The results are shown below:

ΔW, percent _____ 4.8
T.R., percent (with respect to the bischloroformate) _ 71

EXAMPLE 6

Cotton printcloth is padded with an aqueous 17.4% (1.5 M) hexamethylene diamine solution of 1.05 g./ml. density to obtain 107% wet pick-up. It is subsequently after-treated with reagent solutions in CCl₄. The results are shown in Table IV.

TABLE V

| | Reagent B | | | | | |
|---|---|---|---|---|---|---|
| | Hexamethylene diamine | | | Bisphenol A | | |
| | Drying time between steps 1 and 2 (min.) | | | Drying time between steps 1 and 2 (min.) | | |
| | 0 | 1 | 4 | 0 | 1 | 4 |
| Orlon: | | | | | | |
| ΔW, percent | 13.6 | 7.1 | 8.2 | 18.3 | 13.2 | 14.9 |
| T.R., percent | 100 | 52 | 60 | 100 | 92 | 81 |
| Stiffness [1] | 3 | 2 | 2 | 3 | 3 | 3 |
| Nylon: | | | | | | |
| ΔW, percent | 4.5 | 2.9 | 2.6 | 80 | 8.0 | 5.6 |
| T.R., percent | 92 | 60 | 53 | 100 | 100 | 70 |
| Stiffness [1] | 3 | 1 | 1 | 3 | 3 | 3 |
| Dacron: | | | | | | |
| ΔW, percent | 5.6 | 3.5 | 3.2 | 9.1 | 9.3 | 9.3 |
| T.R., percent | 98 | 59 | 54 | 100 | 100 | 100 |
| Stiffness [1] | 3 | 1 | 1 | 3 | 3 | 3 |
| Rayon: | | | | | | |
| ΔW, percent | 15.5 | 15.3 | 15.8 | 25.4 | 22.4 | 22.3 |
| T.R., percent | 100 | 98 | 100 | 100 | 88 | 88 |
| Stiffness [1] | 3 | 3 | 2 | 3 | 3 | 3 |
| Cotton: | | | | | | |
| ΔW, percent | 14.0 | 13.8 | 13.9 | 21.7 | 22.0 | 21.7 |
| T.R., percent | 100 | 100 | 100 | 100 | 100 | 100 |
| Stiffness [1] | 3 | 2 | 1 | 3 | 3 | 3 |
| Wool: | | | | | | |
| ΔW, percent | 22.5 | 19.3 | 19.3 | 28.0 | 24.7 | 24.5 |
| T.R., percent | 98 | 83 | 83 | 70 | 62 | 62 |
| Stiffness [1] | 3 | 3 | 1 | 3 | 3 | 2 |

[1] Stiffness ratings: 1=unchanged, 2=medium, 3=very stiff.

TABLE IV

| | Concentration of reagent A (mole/liter) | Reagent A | ΔW, percent | T.R.[1], percent |
|---|---|---|---|---|
| Run No.: | | | | |
| 45 | 1 | Ethyleneglycol bischloroformate | 11.7 | 27 |
| 46 | 0.5 | do | 8.2 | 19 |
| 47 | 1 | Diethyleneglycol bischloroformate | 20.5 | 49 |
| 48 | 0.5 | do | 17.9 | 43 |
| 49 | 1 | Adipoyl chloride | 3.5 | 10 |
| 50 | 0.5 | do | 1.8 | 5 |
| 51 | 1 | Sebacoyl chloride | 8.6 | 20 |
| 52 | 0.5 | do | 7.9 | 18 |

[1] The theoretical retention refers in this table to hexamethylene diamine.

EXAMPLE 7

A 0.5 M CCl₄ solution of diethyleneglycol bischloroformate is padded on different fabrics. After an optional drying step, the fabrics are immersed into either an aqueous 1.5 M hexamethylene diamine containing 1% NaOH or an aqueous 0.75 M bisphenol A disodium salt. The results are shown in Table V.

All wool flannel fabrics become shrinkproof by virtue of these treatments, the felting shrinkage being reduced from the original 55% to less than 5%. The stiffness of fabrics with stiffness ratings 3 and 2 is permanent, being very little reduced by washing. The cotton and rayon fabrics to which bisphenol A is applied in the second step, without drying between steps 1 and 2 become water-repellent, this being evaluated as shown in Example 2.

The visual appearance of all fabrics which have been partially dried between treatment steps 1 and 2 remains unchanged. These fabrics have an air-permeability not lower than 1/3 of that of the untreated blanks. Surface resin can be observed on the other fabrics and these fabrics have about 5 to 20 times lower air-permeability than the untreated blanks.

EXAMPLE 8

Wool flannel is treated as described in Example 2–6, run numbers 2, 3, 6–10, 12–20, 24, 29–33, 38–41, 43–52. These treatments reduce the felting shrinkage from the original 55% to less than 5%.

The treatments where the reactant A is applied in the first step in a non-polar organic solvent considerably stiffen the fabrics. However, when reagent A is applied from an aqueous emulsion, or when it is applied in the second step (Run No. 33, 41, 43–52), the treated fabrics have a soft hand and the deposited polymer has no effect on the appearance of the fabric.

EXAMPLE 9

To impart wash and wear properties to cotton printcloth and rayon challis, an aqueous solution containing 10% formaldehyde and 1% $MgCl_2$ is padded on each of these fabrics. The fabrics are cured at 150° C. for 5 min. and subsequently washed. To improve the abrasion resistance of these fabrics, surface polymer is deposited on them. The abrasion resistance is determined on the TBL ring-wear tester as the number of cycles prior to failure. In the same experiment, wool fabrics are also treated and their felting shrinkage is determined.

Ethylene glycol bischloroformate is applied in the first step in $CCl_4$ solution. The fabrics are air dried for 2 min., and then immersed in an excess of hexamethylene diamine dissolved in 2% aqueous NaOH. The results are shown in Table VI.

TABLE VI

| Concentration, mole/liter | | Formaldehyde treated cotton | | Formaldehyde treated rayon | | |
| --- | --- | --- | --- | --- | --- | --- |
| Ethylene glycol bischloroformate | Hexamethylene diamine | Warp crease recovery (°) | Abrasion resistance, cycles | Warp crease recovery (°) | Abrasion resistance, cycles | Percent felting shrinkage of wool |
| 0 | 0 | 141 | 1,140 | 169 | 90 | 57 |
| 0.02 | 0.06 | | | | | 31 |
| 0.05 | 0.15 | 136 | 2,670 | 143 | 270 | 24 |
| 0.1 | 0.3 | 140 | 2,810 | 146 | 290 | 14 |
| 0.2 | 0.6 | 134 | 4,080 | 142 | 410 | 9 |
| 0.5 | 1.5 | 126 | 10,810 | 139 | 910 | 0 |

EXAMPLE 10

Two carded webs of rayon fibers are placed on one another in a way that in the two webs the orientation of the fibers is perpendicular. This combined web weighs 66 g./m.². It is placed between two flexible screens made of glass fibers, padded with the first step solution, partially dried if so indicated, immersed into the second step solution for 2 min., separated from the glass fiber screens and, after some other optional processing steps, washed in the washing machine. Thus there are optional processing steps between steps 1 and 2 on one hand, and between the 2nd step and the household wash on the other hand. The separate procedures are tabulated below:

| | Air-drying between steps 1 and 2 (min.) | | |
| --- | --- | --- | --- |
| Processing steps between 2nd step and washing | 0 | 2 | 40 |
| None | A | B | C |
| Rinse in cold water, dry overnight | D | E | F |

The results obtained are shown in Table VII.

TABLE VII

| First step solution | Second step solution | | | | | |
| --- | --- | --- | --- | --- | --- | --- |
| Diethylene glycol bischloroformate/ $CCl_4$, M | Hexamethylene diamine, M | Procedure | Δ W, percent | No. of machine washes survived | Breaking strength, lbs./in. | Gurley stiffness, mg. |
| .165 | 0.5 | D | 19.8 | 1 | 8.6 | 2.8 |
| .165 | 0.5 | E | 21.8 | 15 | 11.2 | 5.0 |
| 0.33 | 1.0 | D | 55.2 | 15 | 10.5 | 5.6 |
| 0.33 | 1.0 | E | 57.2 | >25 | 14.6 | 8.3 |
| 0.5 | 1.5 | D | 85.5 | >25 | 13.2 | 11.7 |
| 0.5 | 1.5 | E | 93.0 | >25 | 15.0 | 11.9 |
| 0.5 | 1.5 | A | | 0 | | |
| 0.5 | 1.5 | B | | 2 | | |

| Hexamethylene diamine, M | Diethylene glycol bischloroformate/ $CCl_4$, M | | | | | |
| --- | --- | --- | --- | --- | --- | --- |
| 1.0 | 0.33 | F | | 0 | | |
| 1.0 | 0.33 | C | 59.5 | 3 | 13.0 | 6.7 |
| 1.5 | 0.5 | C | 87.0 | 7.0 | 15.0 | 6.8 |

EXAMPLE 11

Cotton printcloth, wool flannel and a nonwoven rayon web are impregnated with 0.5 M diethyleneglycol bischloroformate in $CCl_4$ in the first step and immediately afterwards after-treated with 1.5 M aqueous hexamethylene diamine. The fabrics are rinsed in cold running water and air dried. All samples are relatively stiff, have flakes of resin on the surface and have low air permeability. They are heat treated for 15 min. at 170° C. The surface of the fabrics becomes smooth, the cotton and wool samples being indistinguishable from untreated samples. All three heat-treated fabrics have a soft hand and their air permeability is high. The wool fabric does not shrink at all on subsequent washings and the nonwoven web survives more than 25 machine washes without change in properties.

EXAMPLE 12

Bread wrap paper is immersed into one reagent solution, blotted with an adsorbent filter paper, immersed into the second solution after optional drying, rinsed in luke warm water containing 1% t-octylphenoxypolyethoxyethanol having about 10 oxyethylene units and dried. The two solutions used are 5% adipoyl chloride in toluene and 5% aqueous hexamethylene diamine with 1% NaOH added. The results are shown in Table VIII.

The second step solution is 0.5 M diethylene glycol bischloroformate in $CCl_4$. Procedure D is used.

TABLE VIII

| First treatment | Drying time, min. | Second treatment | Breaking strength, percent of that of untreated paper | | | |
|---|---|---|---|---|---|---|
| | | | Dry | | Wet | |
| | | | Machine direction | Cross direction | Machine direction | Cross direction |
| Adipoyl chloride | 0 | Hexamethylene diamine | 108 | 61 | 260 | 155 |
| Do | 15 | do | 97 | 83 | 280 | 270 |
| Do | 15 | 1% NaOH | 109 | 63 | 110 | 78 |
| Hexamethylene diamine | 15 | Adipoyl chloride | 58 | 21 | 142 | 103 |

EXAMPLE 13

Vegetable tanned case leather is treated in an identical fashion as paper in Example 12. The abrasion resistance of the treated samples is determined with a Taber Abrader, as specified by the Ford Motor Co., Manufacturing Standards, April 1955, Test MIFI-2-3, Specification 3-11. The scuff resistance of the samples is evaluated by an expert in the field of leather finishing. The results are shown in Table IX.

TABLE IX

| First treatment | Drying time, hr. | Second treatment | Taber Test,[1] percent leather showing | Scuff resistance rating[1] |
|---|---|---|---|---|
| Water | 0.3 | Toluene | 20 | 5 |
| Hexamethylene diamine | 0 | Adipoyl chloride | 5 | 7.5 |
| Do | 0.3 | do | 50 | 6 |
| Do | 8 | do | 50 | 11 |
| Toluene | 0 | Water | 35 | 9 |
| Adipoyl chloride | 0 | Hexamethylene diamine | 75 | 7.5 |
| Do | 10 | do | 20 | 10 |

[1] High values are good ratings.

EXAMPLE 14

Cotton printcloth is padded with an aqueous solution containing Monastral Blue pigment, NaOH and hexamethylene diamine in the first step. After an optional drying step, it is immersed into reagent A solution for 2 minutes in the 2nd step and washed in the washing machine. An optional step between the 2nd step and washing is a mild rinse in running cold water, followed by drying at room temperature for 8 hours or by a heat treatment in a 170° C. oven for 15 min. The different procedures are outlined as follows:

| | Processing between second step and machine wash drying at— | | |
|---|---|---|---|
| | None | Room temperature | Heat treatment |
| Drying time (min.) between 1st and 2d step: | | | |
| 0 | A | B | C |
| Varies | D | | |
| 40 | E | F | G |

A separate (control) fabric is treated only in the first step and then hung on a line and dried. The color of this fabric indicates the upstake of dyestuff. The reflectance of all fabrics determined with the aid of a General Electric Photovolt Meter is expressed as percent of that of white cotton. In this measurement low reflectance indicates high color value. The crock fastness is evaluated by an expert in the field of pigment-dyeing, using standard procedures. Rating 5 is very poor and rating 1 is excellent.

Table X shows the effect of drying time between steps 1 and 2. The first step solution contains 0.5% pigment, 17.5% (1.5 M) hexamethylene diamine and 1% NaOH.

TABLE X.—REFLECTANCE OF CONTROL (PERCENT): 41

| | Drying time, min. | | | | |
|---|---|---|---|---|---|
| | 0 | 5 | 10 | 20 | 40 |
| Water content of fabric entering into 2d step solution, percent | 118 | 107 | 95 | 77 | 18 |
| ΔW, percent | 7.0 | 7.4 | 6.7 | 5.6 | 9.2 |
| Reflectance, percent: | | | | | |
| After 1 machine wash | 66 | 61 | 56 | 55 | 49 |
| After 5 machine washes | 69 | 63 | 57 | 57 | 49 |

In Table XI the effect of different reagents is shown. Procedure E is used and the first step solution is the same as before.

TABLE XI

| Second step reagent | ΔW, percent | Reflectance, percent | | Crock fastness after 1 wash |
|---|---|---|---|---|
| | | 1 wash | 5 washes | |
| 1.0 M (ethylene glycol) | 11.7 | 49 | 52 | 2 |
| 0.5 M (bischloroformate) | 8.2 | 49 | 51 | 2 |
| 1.0 M (diethylene glycol) | 17.9 | 53 | 57 | 1 |
| 0.5 M (bischloroformate) | 20.5 | 54 | 57 | 1 |
| 1.0 M (sebacoyl) | 8.6 | 53 | 56 | 3 |
| 0.5 M (chloride) | 7.9 | 53 | 56 | 3 |
| 1.0 M (adipoyl) | 3.5 | 54 | 58 | 2 |
| 0.5 M (chloride) | 1.9 | 61 | 67 | 3 |
| 1.0 M (isophthaloyl) | 1.7 | 55 | 62 | 4 |
| 0.5 M (chloride) | 1.1 | 53 | 59 | 4 |

The effect of processing variables is shown in Table XII. The second step solution is 0.5 M diethyleneglycol bischloroformate.

TABLE XII.—REFLECTANCE OF CONTROL, PERCENT: 41

| | Procedure | | | | | |
|---|---|---|---|---|---|---|
| | A | B | C | E | F | G |
| ΔW, percent | 9.4 | 10.7 | 8.7 | 9.2 | 10.4 | 9.4 |
| Reflectance, percent: | | | | | | |
| After 1 wash | 53 | 61 | 38 | 53 | 39 | 40 |
| After 5 washes | 55 | 63 | 39 | 57 | 40 | 41 |
| Crock fastness, after 1 wash | 4 | 3 | 2 | 2 | 2 | 1 |

Finally, the polymer concentration is varied in a hexamethylene diamine, diethylene glycol bischloroformate system, according to Procedure F. The results are shown in Table XIII.

TABLE XIII

|  | Hexamethylene diamine concentration (M) | | | | |
| --- | --- | --- | --- | --- | --- |
|  | 0.3 | 0.6 | 0.9 | 1.2 | 1.5 |
|  | Diethyleneglycol bischloroformate conc. (M) | | | | |
|  | 0.1 | 0.2 | 0.3 | 0.4 | 0.5 |
| ΔW, percent | 0.6 | 1.6 | 3.8 | 6.6 | 8.8 |
| Reflectance of control, percent | 42 | 44 | 46 | 46 | 45 |
| Reflectance of treated samples: | | | | | |
| 1 wash | 55 | 46 | 42 | 46 | 42 |
| 5 washes | 63 | 50 | 44 | 47 | 42 |
| Crock fastness after 1 wash | 4 | 4 | 3 | 2 | 2 |

EXAMPLE 15

Nylon challis is padded in the first step with an aqueous solution containing 4% hexamethylene diamine, 0.75% KOH and 2.5% of a poly(dimethylaminoethyl methacrylate) quaternized by means of ethylene oxide. It is subsequently treated, in the second step, with 5% adipoyl chloride in benzene. This fabric and some controls are thoroughly washed and the surface resistance values are determined. The results are shown in Table XIV.

TABLE XIV

| | Log Ω/cm.$^2$ |
| --- | --- |
| Untreated | >13 |
| First step only | >13 |
| First and second steps | 10.3 |
| First and second steps in reversed order of application | 12.3 |

I claim:
1. A process for modifying a fibrous substrate which comprises forming an oil-in-water emulsion, the oil phase of which contains a reactant A dissolved in a water-immiscible non-polar solvent and the aqueous phase of which contains a reactant B dissolved therein, applying the emulsion and an alkaline catalyst to a fibrous substrate at a temperature of $-10°$ C. to $+100°$ C. to effect reaction between the reactants therein and the formation of a condensation polymer in contact with fibers of the substrate, reactant A being selected from the group consisting of dicarboxylic acid halides, disulfonic acid halides, bishaloformates, and biscarbamyl halides and reactant B being selected from the group consisting of guanidine, thiourea, dithiobiuret, diamines, diphenolates, dithiols, aminoalkylphenolates, and aminothiols.

2. A process for treating a fibrous material which comprises serially depositing on said fibrous material in superposed phases in interfacial relationship a pair of complementary, direct-acting, organic, polyamide-forming intermediates, at least one of said phases being liquid, the said intermediates directly reacting under said conditions to form a polyamide in situ on said material.

3. A process for treating a fibrous material which comprises serially applying to said fibrous material a pair of complementary, direct-acting, organic, polyamide-forming intermediates in separate liquid phases of limited mutual solubility.

4. A process for treating a fibrous material which comprises serially distributing on the surface of the fiber elements of said material a pair of complementary, direct-acting, organic, polyamide-forming intermediates in superposed phases of limited mutual solubility, at least one of said phases being liquid, the said intermediates reacting under such conditions to form a polyamide in situ on said fiber elements.

5. A process for treating a fibrous material which comprises serially impregnating a fibrous material with two solutions, one solution containing one member of a pair of complementary, direct-acting, organic, polyamide-forming intermediates in a first solvent, the other solution containing the complementary member of said pair of complementary, direct-acting, organic, polyamide-forming intermediates in a second solvent, the first and second solvents being substantially mutually immiscible, the said pair of intermediates reacting rapidly under said conditions to form in situ on the fibers a resinous polyamide.

6. The process of claim 5 wherein the members of said pair of complementary, direct-acting, organic, polyamide-forming intermediates are a diamine and a diacid chloride.

7. A process for shrinkproofing wool without significant impairment of its hand, which comprises serially impregnating wool with two solutions, one solution containing a diamine dispersed in water, the other solution containing a bischloroformate dispersed in an inert, volatile, essentially water-immiscible solvent, the said diamine and bischloroformate reacting to form in situ on the wool fibers a resinous polyurethane.

8. The process of claim 7 wherein the diamine has the formula:

$$H_2N-(CH_2)_n-NH_2$$

wherein $n$ has a value from 6 to 10.

9. The process of claim 7 wherein the bischloroformate has the formula:

$$Cl-\overset{O}{\underset{\|}{C}}-O-(CH_2)_n-O-\overset{O}{\underset{\|}{C}}-Cl$$

wherein $n$ has a value from 2 to 10.

10. The process of claim 7 wherein the diamine is hexamethylene diamine.

11. The process of claim 7 wherein the bischloroformate is ethylene glycol bischloroformate.

12. The process of claim 7 wherein the bischloroformate is diethylene glycol bischloroformate.

13. The process of claim 7 wherein the bischloroformate is 1,6-hexanediol bischloroformate.

14. A process for shrinkproofing wool without significant impairment of its hand which comprises serially impregnating wool with two solutions, one containing a diamine in a first solvent, the other containing a bischloroformate in a second solvent, the first and second solvents being substantially mutually immiscible, the said diamine and bischloroformate reacting to form in situ on the wool fibers a resinous polyurethane.

15. A process for treating a fibrous material which comprises applying serially to said material in interfacial relationship, a pair of complementary direct-acting organic polyurethane-forming intermediates.

16. A process for treating a fibrous material which comprises serially applying to said material a pair of complementary direct-acting organic polyurethane-forming intermediates in separate phases of limited mutual solubility.

17. A process for treating a fibrous material which comprises serially distributing on the surface of the fiber elements of said material a pair of complementary direct-acting organic polyurethane-forming intermediates in superposed phases of limited mutual solubility, the said intermediates reacting under such conditions to form a polymer in situ on said fiber elements.

18. A process for treating a fibrous material which comprises serially impregnating a fibrous material with two solutions, one solution containing one member of a pair of complementary direct-acting, organic, polyurethane-forming intermediates in a first solvent, the other solution containing the complementary member of said pair of complementary direct-acting, organic, polyurethane-forming intermediates in a second solvent, said first and second solvents being substantially mutually immiscible, the said pair of intermediates reacting rapidly under said conditions to form in situ on the fibers a resinous polyurethane.

19. A process for shrinkproofing wool without significant impairment of its hand which comprises serially impregnating wool with two solutions, one solution containing a diamine in a first solvent, the other containing a diacid chloride and a bischloroformate in a second solvent, said first and second solvents being substantially immiscible with one another.

20. A process for treating a fibrous material which comprises serially applying to said material a pair of complementary direct-acting organic condensation interpolymer-forming intermediates in separate liquid phases of limited mutual solubility.

21. A process for treating a fibrous material which comprises serially distributing on the surface of the fiber elements of said material a pair of complementary direct-acting organic condensation interpolymer-forming intermediates in superposed liquid phases of limited mutual solubility, the said intermediates reacting under such conditions to form an interpolymer in situ on said fiber elements.

22. A process for treating a fibrous material which comprises serially impregnating a fibrous material with two solutions, one solution containing one member of a pair of complementary, direct-acting, organic, condensation interpolymer-forming intermediates in a first solvent, the other solution containing the complementary member of said pair of complementary, direct-acting, organic condensation interpolymer-forming intermediates in a second solvent, said first and second solvents being substantially mutually immiscible, the said pair of intermediates reacting rapidly under said conditions to form in situ on the fibers a resinous interpolymer.

23. A process for shrinkproofing wool without significant impairment of its hand which comprises serially impregnating wool with two solutions, one solution containing an aromatic diol dispersed in water, the other solution containing a diacid chloride dispersed in an inert, volatile, essentially water-immiscible solvent, the diol and diacid chloride reacting to form in situ on the wool fibers a resinous polyester.

24. A process for shrinkproofing wool without significant impairment of its hand which comprises serially impregnating wool with two solutions, one solution containing an aromatic diol dispersed in water, the other solution containing a bischloroformate dispersed in an inert, volatile, essentially water-immiscible solvent, the diol and bischloroformate reacting to form in situ on the wool fibers a resinous polycarbonate.

25. As an article of manufacture, a textile fabric of wool stabilized against excessive shrinkage on washing by a deposit thereon of a polyester formed in situ, the article being the product of the process which comprises serially impregnating the wool fabric over the same area with two solutions, one solution containing a dihydroxy compound having hydroxyl groups in which the hydrogen is more active than alcoholic hydroxyl dispersed in water, the other solution containing a diacid chloride dispersed in an inert, volatile, essentially water-immiscible solvent.

26. As an article of manufacture, a textile fabric of wool stabilized against excessive shrinkage on washing by a deposit thereon of a polyester formed in situ, the article being the product of the process which comprises serially impregnating the wool fabric over the same area with two solutions, one solution containing an alkali metal diphenolate dispersed in water, the other solution containing a diacid chloride dispersed in an inert, volatile, essentially water-immiscible solvent.

27. As an article of manufacture, a textile fabric of wool stabilized against excessive shrinkage on washing by a deposit thereon of a polycarbonate formed in situ, the article being the product of the process which comprises serially impregnating the wool fabric over the same area, with two solutions, one solution containing a dihydroxy compound having hydroxyl groups in which the hydrogen is more active than alcoholic hydroxyl dispersed in water, the other solution containing a bischloroformate dispersed in an inert, volatile, essentially water-immiscible solvent.

28. As an article of manufacture, a textile fabric of wool stabilized against excessive shrinkage on washing by a deposit thereon of a polycarbonate formed in situ, the article being the product of the process which comprises serially impregnating the wool fabric over the same area, with two solutions, one solution containing an alkali metal diphenolate dispersed in water, the other solution containing a bischloroformate dispersed in an inert, volatile, essentially water-immiscible solvent.

29. A process for modifying a fibrous substrate which comprises providing (1) a liquid medium containing a reactant A dissolved in an organic solvent essentially immiscible with water and (2) a liquid medium containing a reactant B dissolved in an aqueous solvent, each liquid medium being a separate liquid phase substantially immiscible with the other, one of said media containing a hydrogen halide acceptor, applying one of the reactant-containing media to the substrate over at least part of its area at a temperature in the range of $-10°$ to $+100°$ C., partially drying the resulting substrate to reduce the solvent content to 5% to 300% by weight, based on the dry weight of the substrate, then applying to the same portion of the substrate the other of the reactant-containing media at a temperature in the range of $-10°$ to $+100°$ C. to effect reaction between reactants A and B and the formation of a condensation polymer in contact with fibers of the substrate, reactant A being selected from the group consisting of dicarboxylic acid halides, disulfonic acid halides, and bishaloformates and reactant B being selectet from the group consisting of guanidine, thiourea, dithiobiuret, diamines, diphenolates, dithiols, aminoalkylphenolates, and aminothiols.

30. A process according to claim 29 in which reactant A is dissolved in a non-polar water-immiscible organic solvent and reactant B is dissolved in water.

31. A process for modifying a fibrous substrate which comprises providing (1) a liquid medium containing a reactant A dissolved in a non-polar water-immiscible organic solvent and (2) a liquid medium containing a reactant B dissolved in an aqueous solvent essentially immiscible with the aforementioned organic solvent, applying one of the reactant-containing media at a temperature in the range of $-10°$ C. to $+100°$ C. to the fibrous substrate over at least a portion of its area, partially drying the resulting substrate, to reduce the solvent content to 5% to 300% by weight, based on the dry weight of the substrate, then applying to the same portion of the substrate the other of the reactant-containing media at a temperature in the range of $-10°$ to $+100°$ C., thereby effecting reaction between reactants A and B and the formation of a condensation polymer in contact with fibers of the substrate, and drying the substrate with a deposit of the polymer thereon, reactant A being selected from the group consisting of dicarboxylic acid halides, disulfonic acid halides and bis-haloformates and reactant B being selected from the group consisting of guanidine, thiourea, dithiobiuret, diamines, diphenolates, dithiols, aminoalkylphenolates, and aminothiols, the aqueous medium (2) also containing a hydrogen halide acceptor when reactant B therein is not an amine.

32. The process according to claim 29 wherein a dyestuff is incorporated into at least one of the reactant media.

33. The process according to claim 29 wherein two to four chemically different reactants of the type of reagent A are dissolved in the first-mentioned liquid medium whereby a plurality of reagents A are simultaneously combined with reagent B to give a copolymer deposit on the fibrous substrate.

34. The process according to claim 29 wherein two to four chemically different reactants of the type B are dissolved in the second-mentioned liquid medium whereby a plurality of reagents B are simultaneously combined with reagent A to give a copolymer deposit on the fibrous substrate.

35. A process as defined in claim 29 which comprises the additional step of heating the dried polymer depositcarrying substrate to a temperature of 150° C. to 250° C. to fuse the deposit thereto.

36. A process for modifying a textile fabric formed of a plurality of fibers selected from the group consisting of wool fibers, cotton fibers, silk fibers, and synthetic man-made fibers which comprises providing (1) a liquid medium containing a reactant A dissolved in a non-polar water-immiscible organic solvent and (2) a liquid medium containing a reactant B dissolved in an aqueous solvent essentially immiscible with the forementioned organic solvent, applying one of the reactant-containing media at a temperature in the range of −10° C. to +100° C. to the textile fabric over at least a portion of its area, partially drying the resulting fabric to reduce the solvent content to 5% to 300% by weight, based on the dry weight of the fabric, then applying to the same portion of the fabric the other of the reactant-containing media at a temperature in the range of −10° to +100° C., thereby effecting reaction between reactants A and B and the formation of a condensation polymer in contact with fibers of the fabric, and drying the fabric with a deposit of the polymer thereon, reactant A being selected from the group consisting of dicarboxylic acid halides, disulfonic acid halides, and bishaloformates and reactant B being selected from the group consisting of guanidine, thiourea, dithiobiuret, diamines, diphenolates, dithiols, aminoalkylphenolates, and aminothiols, the aqueous medium (2) also containing a hydrogen halide acceptor when reactant B therein is not an amine.

37. A process for modifying a woven textile fabric formed of a plurality of fibers selected from the group consisting of wool fibers, cotton fibers, silk fibers, and synthetic man-made fibers which comprises providing (1) a liquid medium containing a reactant A dissolved in a non-polar water-immiscible organic solvent and (2) a liquid medium containing a reactant B dissolved in an aqueous solvent essentially immiscible with the aforementioned organic solvent, applying one of the reactant-containing media at a temperature in the range of −10° C. to +100° C. to the woven textile fabric over at least a portion of its area, partially drying the resulting fabric to reduce the solvent content to 5% to 300% by weight, based on the dry weight of the fabric, then applying to the same portion of the fabric the other of the reactant-containing media at a temperature in the range of −10° C. to +100° C., thereby effecting reaction between reactants A and B and the formation of a condensation polymer in contact with fibers of the fabric, and drying the fabric with a deposit of the polymer thereon, reactant A being selected from the group consisting of dicarboxylic acid halides, disulfonic acid halides, and bishaloformates and reactant B being selected from the group consisting of guanidine, thiourea, dithiobiuret, diamines, diphenolates, dithiols, aminoalkylphenolates, and aminothiols, the aqueous medium (2) also containing a hydrogen halide acceptor when reactant B therein is not an amine.

38. A process for modifying a non-woven textile fabric formed of a plurality of fibers selected from the group consisting of cotton fibers, silk fibers, and synthetic man-made fibers which comprises providing (1) a liquid medium containing a reactant A dissolved in a non-polar water-immiscible organic solvent and (2) a liquid medium containing a reactant B dissolved in an aqueous solvent essentially immiscible with the aforementioned organic solvent, applying one of the reactant-containing media at a temperature in the range of −10° C. to +100° C. to the non-woven textile fabric over at least a portion of its area, partially drying the resulting fabric to reduce the solvent content to 5% to 300% by weight, based on the dry weight of the fabric, then applying to the same portion of the fabric the other of the reactant-containing media at a temperature in the range of −10° C. to +100° C., thereby effecting reaction between reactants A and B and the formation of a condensation polymer in contact with fibers of the fabric, and drying the fabric with a deposit of the polymer thereon, reactant A being selected from the group consisting of dicarboxylic acid halides, disulfonic acid halides, and bishaloformates and reactant B being selected from the group consisting of guanidine, thiourea, dithiobiuret, diamines, diphenolates, dithiols, aminoalkylphenolates, and aminothiols, the aqueous medium (2) also containing a hydrogen halide acceptor when reactant B therein is not an amine.

39. A process for modifying a fibrous substrate which comprises providing (1) a liquid medium containing a reactant A dissolved in an organic solvent essentially immiscible with water and (2) a liquid medium containing a reactant B dissolved in an aqueous solvent, each liquid medium being a separate liquid phase substantially immiscible with the other, one of said media containing a hydrogen halide acceptor, applying one of the reactant-containing media to a substrate of leather, paper, wood, or textile fabric formed of fibers or yarns over at least part of its area at a temperature in the range of −10° C. to +100° C., then applying to the same portion of the substrate the other of the reactant-containing media at a temperature in the range of −10° C. to +100° C. to effect reaction between reactants A and B and the formation of a condensation polymer in contact with fibers of the substrate, reactant A being selected from the group consisting of dicarboxylic acid halides, disulfonic acid halides, and bishaloformates and reactant B being selected from the group consisting of guanidine, thiourea, dithiobiuret, diamines, diphenolates, dithiols, aminoalkyl phenolates and aminothiols.

40. A process according to claim 39 in which reactant A is dissolved in a non-polar water-immiscible organic solvent and reactant B is dissolved in water.

41. A process for shrinkproofing wool which comprises serially impregnating wool with two solutions, one solution containing an organic compound having at least two active hydrogen atoms which are more reactive than alcoholic hydrogen dissolved or dispersed in water, the other containing an organic compound having two acyl halide groups dispersed in an inert, volatile, essentially water-immiscile solvent, the respective compounds in the two solutions reacting to form in situ on the wool fibers a resinous condensation product selected from the group consisting of polyamides, polysulfonamides, polyurethanes, polyesters, and polycarbonates, and one of the solutions containing a hydrogen halide acceptor.

42. A process according to claim 41 in which the first-mentioned compound is a dihydroxy compound and its solution contains a hydrogen halide acceptor, and the second is a dicarboxylic acid chloride.

43. A process according to claim 41 in which the first-mentioned compound is a dihydroxy compound and its solution contains a hydrogen halide acceptor, and the second is a bischloroformate.

44. A process for shrinkproofing wool which comprises serially impregnating wool with two solutions, one solution containing a diamine dispersed in water, the other solution containing a diacid chloride dispersed in an inert, volatile, essentially water-immiscible solvent, the said diamine and diacid chloride reacting to form in situ on the wool fibers a resinous polyamide.

45. The process of claim 33 wherein the diamine has the formula

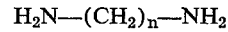

wherein $n$ has a value from 6 to 10.

46. The process of claim 44 wherein the diacid chloride has the formula

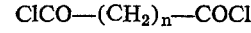

wherein $n$ has a value from 4 to 10.

(References on following page)

References Cited

UNITED STATES PATENTS

| | | | |
|---|---|---|---|
| 2,644,773 | 7/1953 | Hammer et al. | 117—141 |
| 2,123,152 | 7/1958 | Rivat | 117—1 |
| 2,350,139 | 5/1944 | Widmer et al. | 117—139.5 |
| 2,468,716 | 4/1949 | Nyquist | 8—128 |
| 2,526,637 | 10/1950 | Cupery | 117—161 |
| 2,708,617 | 5/1955 | Magat et al. | 8—54 |
| 2,913,433 | 11/1959 | Wittbecker | 260—47 |
| 2,955,958 | 10/1960 | Brown | 117—113 |
| 2,955,961 | 10/1960 | Koller | 117—161 |
| 2,956,903 | 10/1966 | Spencer | 117—96 |
| 3,027,276 | 3/1959 | Cohen et al. | |
| 3,078,138 | 2/1963 | Miller et al. | 8—128 |
| 3,078,242 | 2/1963 | Morgan | 260—45.4 |
| 3,079,216 | 2/1963 | Whitfield et al. | 8—128 |
| 3,079,217 | 2/1963 | Whitfield et al. | 8—128 |
| 3,084,018 | 4/1963 | Whitfield et al. | 8—128 |
| 3,084,019 | 4/1963 | Whitfield et al. | 8—128 |
| 3,093,441 | 6/1963 | Whitfield et al. | 8—128 |

OTHER REFERENCES

American Dyestuff Reporter, p. 38L, October 1960.

Moncrief, The Textile Reporter, August 1949, pp. 388–391.

Whitfield et al., Textile Research J., 1961, p. 74, January 1961.

Barr, Society of Dyers and Colorists, November 1946 pp. 338–345.

DONALD LEVY, Primary Examiner

U.S. Cl. X.R.

8—6, 12, 127, 128, 177; 117—80, 130.5, 140, 142, 145, 148, 155, 161